(12) United States Patent
Yomo et al.

(10) Patent No.: US 8,068,456 B2
(45) Date of Patent: Nov. 29, 2011

(54) SYSTEM AND METHOD FOR TRANSMITTING AND RECEIVING SIGNALS IN A COMMUNICATION SYSTEM USING RELAY SCHEME

(75) Inventors: Hiroyuki Yomo, Aalborg (DK);
Elisabeth de Carvalho, Aalborg (DK);
Kathiravetpillai Sivanesan, Suwon-si (KR); Eun-Taek Lim, Suwon-si (KR);
Young-Kwon Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 729 days.

(21) Appl. No.: 12/041,213

(22) Filed: Mar. 3, 2008

(65) Prior Publication Data
US 2008/0212515 A1 Sep. 4, 2008

(30) Foreign Application Priority Data

Mar. 2, 2007 (KR) .................. 10-2007-0021182

(51) Int. Cl.
*H04W 4/00* (2009.01)
*H04J 3/16* (2006.01)
*H04J 3/22* (2006.01)
(52) U.S. Cl. ...................... 370/329; 370/468
(58) Field of Classification Search .......... 370/328, 370/329, 468
See application file for complete search history.

(56) References Cited

U.S. PATENT DOCUMENTS

| 6,178,196 B1 * | 1/2001 | Naguib et al. ............ 375/148 |
| 6,370,384 B1 | 4/2002 | Komara |
| 2006/0030305 A1 * | 2/2006 | Lee et al. ............ 455/418 |
| 2006/0193280 A1 | 8/2006 | Lee et al. |

FOREIGN PATENT DOCUMENTS

| KR | 1020050101890 | 10/2005 |
| KR | 100584409 | 5/2006 |
| WO | WO 2005/067173 | 7/2005 |

* cited by examiner

*Primary Examiner* — Ronald Abelson
(74) *Attorney, Agent, or Firm* — The Farrell Law Firm, P.C.

(57) ABSTRACT

A system and method for transmitting and receiving a signal in a communication system using a relay scheme. A base station receives a first signal in a first time interval from a first mobile station which is at least one mobile station located in a third region which is a region where a first region which is a region of the base station itself overlaps with a second region which is a region of a relay station. The relay station receives a second signal in the first time interval from a second mobile station which is at least one mobile station located in a fourth region which is a region not overlapping with the first region in the second region, and receives the first signal from the first mobile station. The relay station transmits a third signal including the first signal and the second signal to the base station in a second time interval. The base station receives the third signal in the second time interval, and cancels the first signal from the third signal to detect the second signal.

24 Claims, 2 Drawing Sheets

SYSTEM AND METHOD FOR TRANSMITTING AND RECEIVING SIGNALS IN A COMMUNICATION SYSTEM USING RELAY SCHEME

This application claims priority under 35 U.S.C. §119(a) to a Korean Patent Application filed in the Korean Intellectual Property Office on Mar. 2, 2007 and assigned Serial No. 2007-21182, the disclosure of which is hereby incorporated by reference.

BACKGROUND OF THE INVENTION

1. Field of the Invention

The present invention relates to a system and method for transmitting and receiving signals in a communication system using a relay scheme, referred to herein as a relay communication system.

2. Description of the Related Art

Currently, wireless communications are evolving from $3^{rd}$ generation wireless communication systems into $4^{th}$ generation wireless communication systems. $4^{th}$ generation wireless communication system studies are being conducted to provide higher data rates and to expand wireless transmission regions, service coverages, etc. A multi-hop scheme has been proposed for service coverage expansion. In the multi-hop scheme, a Relay Station (RS) designed with a low cost for communication of Mobile Stations (MSs) located in an edge of the cell coverage, relays signals to the mobile stations located in the edge of the cell coverage. Also, the relay station can relay signals of the mobile stations to a Base Station (BS).

Due to the presence of the relay station, there can be, for example, three types of wireless links including (1) a link between the BS and the RS (a BS-RS link), (2) a link between the RS and the MSs (a RS-MS link), and (3) a link between the BS and the MSs (a BS-MS link). An increase in the number of links may cause an increase in wireless resources used in a system which may have limited wireless resources. In such a case, the system may suffer from more frequent signal interferences, compared to a communication system in which there is only a BS-MS link due to the absence of the RS.

In order to prevent such signal interference problems, it is possible to separate each link by time or frequency and transmit/receive signals over the link. For example, a first time interval or first frequency resource can be used for signal transmission/reception over the MS-RS link, and a second time interval or second frequency resource can be used for signal transmission/reception over the RS-BS link. However, the signal transmission/reception based on the separation of the time or frequency resources has no change because limited wireless resources are used on a division basis.

SUMMARY OF THE INVENTION

The present invention substantially addresses at least the above-described problems and/or disadvantages and provides at least the advantages described below. Accordingly, an aspect of the present invention is to provide a system and method for transmitting and receiving signals in a relay communication system.

According to an aspect of the present invention, there is provided a method for transmitting and receiving a signal in a communication system using a relay scheme. The method includes receiving, by a base station, a first signal in a first time interval from a first mobile station which is at least one mobile station located in a third region which is a region where a first region which is a region of the base station itself overlaps with a second region which is a region of a relay station; receiving, by the relay station, a second signal in the first time interval from a second mobile station which is at least one mobile station located in a fourth region which is a region not overlapping with the first region in the second region, and receiving the first signal from the first mobile station; transmitting, by the relay station, a third signal including the first signal and the second signal to the base station in a second time interval; and receiving, by the base station, the third signal in the second time interval, and cancelling the first signal from the third signal to detect the second signal.

According to another aspect of the present invention, there is provided a method for transmitting and receiving a signal in a communication system using a relay scheme. The method includes receiving, by a base station, a signal in a first time interval from at least one mobile station located in a region not overlapping with a region of each of a plurality of relay stations in a region of the base station itself, in which the plurality of relay stations and a plurality of mobile stations are located; transmitting, by each of mobile stations located in the region of each of the plurality of relay stations, a signal to a corresponding relay station among the plurality of relay stations using the same wireless resource in the first time interval; and transmitting, by each of the plurality of relay stations, signals received from the mobile stations located in the region of each of the plurality of relay stations, to the base station in a second time interval.

According to a further aspect of the present invention, there is provided a system for transmitting and receiving a signal in a communication system using a relay scheme. The system includes a base station; a relay station; a first mobile station which is at least one mobile station located in a third region which is a region where a first region which is a region of the base station overlaps with a second region which is a region of the relay station; and a second mobile station which is at least one mobile station located in a fourth region which is a region not overlapping with the first region in the second region. The base station receives a first signal from the first mobile station in a first time interval. The relay station receives a second signal from the second mobile station in the first time interval, receives the first signal from the first mobile station, and transmits a third signal including the first signal and the second signal to the base station in a second time interval. The base station receives the third signal in the second time interval, and cancels the first signal from the third signal to detect the second signal.

According to yet another aspect of the present invention, there is provided a system for transmitting and receiving a signal in a communication system using a relay scheme. The system includes a plurality of mobile stations; a plurality of relay stations; and a base station having a region in which the plurality of mobile stations and the plurality of relay stations are located. The base station receives a signal in a first time interval from at least one mobile station located in a region not overlapping with a region of each of the plurality of relay stations in a region of the base station itself. Each of mobile stations located in the region of each of the plurality of relay stations, transmits a signal to a corresponding relay station among the plurality of relay stations using the same wireless resource in the first time interval. Each of the plurality of relay stations transmits signals received from the mobile stations located in the region of each of the plurality of relay stations, to the base station in a second time interval.

BRIEF DESCRIPTION OF THE DRAWINGS

The above and other aspects, features and advantages of the present invention will become more apparent from the fol-

BRIEF DESCRIPTION OF THE DRAWINGS lowing detailed description when taken in conjunction with the accompanying drawings in which.

DETAILED DESCRIPTION OF THE PREFERRED EMBODIMENTS

Preferred embodiments of the present invention will now be described in with reference to the annexed drawings. In the following description, a description of known functions and configurations incorporated herein has been omitted for clarity and conciseness.

The present invention provides a system and method for transmitting and receiving signals in a communication system using a relay scheme, referred to herein as a relay communication system. The relay communication system includes a Base Station (BS), a Mobile Station (MS) and a Relay Station (RS). Due to the presence of the RS, the number of wireless links increases. The increase in the number of wireless links may cause a considerable signal interference problem in signal transmission/reception.

Accordingly, the present invention provides a signal transmission/reception method capable of reducing or cancelling the signal interference, especially the uplink signal interference, on the following assumptions.

First, the base station and the relay station provided by the present invention can acquire information on the timing and frequency offsets for all MSs located in their coverage. The information acquisition of the BS and the RS can be achieved through a ranging procedure. More specifically, the BS and the RS can acquire the timing and frequency offset information through overhearing of the ranging-related signals transmitted from the MSs. For example, when the MSs are located in the overlapping coverage of the BS and the RS and are serviced by the BS, the RS can receive the ranging signals transmitted from the MSs to the BS in an overhearing manner. Also, the BS can receive the ranging signals. The information acquired by the RS can be forwarded to the BS, so that the BS can acquire timing and frequency offset information of all BS-MS links and RS-MS links.

Next, the BS provided by the present invention can acquire information on channel states of all BS-MS links and RS-MS links. If the relay communication system is based on a Time Division Duplexing (TDD) scheme, an MS can acquire information on the channel state by measuring strength of a reference signal (preamble or pilot) received from the BS or the RS for a time interval of a downlink frame. The MS transmits the channel state information directly to the BS, or to the BS by way of the RS, and the BS can acquire the channel state information for all BS-MS links and RS-MS links. In addition, the BS is assumed to have channel state information and timing and frequency offset information for the BS-RS link.

A description will now be made of a scheme for solving the signal interference problems according to the following three embodiments, to improve wireless resource efficiency.

Figure 1:
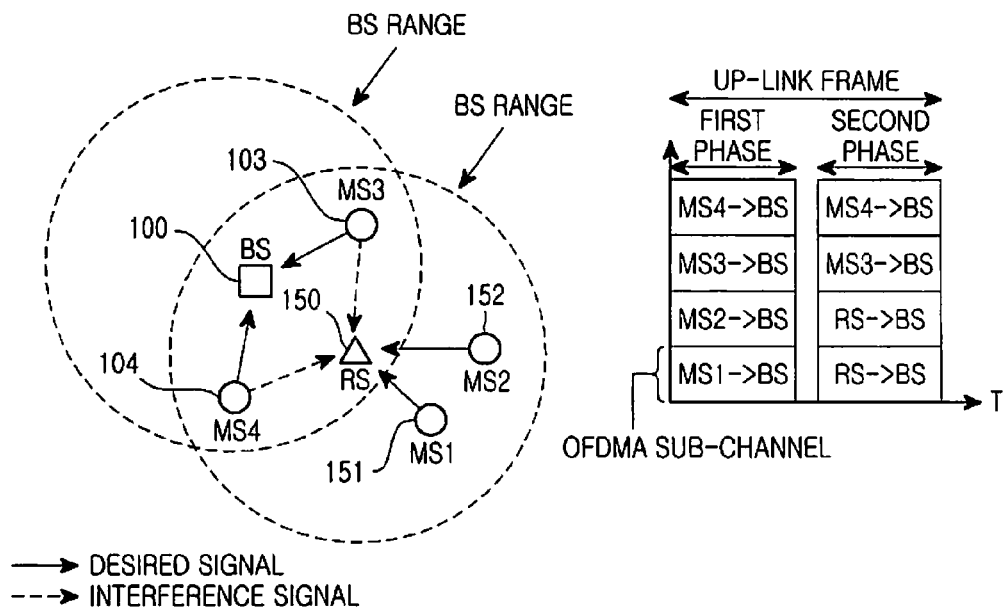
FIG. 1 is a diagram illustrating a cell structure and a frame structure for signal transmission/reception according to a first embodiment of the present invention.

A first embodiment described below with reference to FIG. 1 provides a scheme for cancelling Inter-Carrier Interference (ICI) and Inter-Symbol Interference (ISI) in a relay communication system using Orthogonal Frequency Division Multiple Access (OFDMA).

FIG. 1 shows a cell structure and a frame structure for signal transmission/reception according to the first embodiment of the present invention.

In FIG. 1, an MS #3 (MS3) 103 and an MS #4 (MS4) 104 are located in a region (or coverage) of a BS 100, and an MS #2 (MS2) 152 and an MS #1 (MS1) 151 are located in a region of an RS 150. While signals of the MS1 151 and the MS2 152 may not serve as interference signals to the BS 100, signals of the MS3 103 and the MS4 104 may serve as interference signals to the RS 150.

In the relay communication system, an uplink frame can be divided into two phases. For example, FIG. 1 shows that the uplink frame is divided into a first phase and a second phase so that the phases are separated by the time.

In the first phase, the RS 150 operates in a reception mode where the RS 150 receives signals from MSs, and in the second phase, the RS 150 operates in a transmission mode where the RS 150 transmits signals to the BS 100.

In FIG. 1, when the MS1 151 and the MS2 152 are allocated different subchannels, the RS 150 can decode the signals in an interference-free condition. When there are remaining subchannels, the remaining subchannels can be allocated to the MS3 103 and the MS4 104 to improve the resource efficiency. In this case, however, the RS 150 may receive signals of the MS3 103 and the MS4 104 as interference signals. That is, the RS 150 may suffer from ICI or ISI.

The present invention can more efficiently perform signal transmission/reception by using the following method for solving the signal interference problems.

First, the MS3 103 and the MS4 104 transmit signals targeting the BS 100, and the MS1 151 and the MS2 152 transmit signals targeting the RS 150. The RS 150 receives the signals of the MS 1 151 and the MS2 152 in the first phase, and amplifies and relays the received signals to the BS 100 in the second phase. Before the signal amplification, the RS 150 sets power of the subcarriers used by the MS3 103 and the MS4 104, to zero. As a result, signal components of the MS3 103 and the MS4 104 are cancelled from the signals of the MS1 151 and the MS2 152, transmitted from the RS 150 to the BS 100.

If the remaining subchannels are available in the second phase, the remaining subchannels are used for the MS3 103 and the MS4 104. Then, in the second phase, because there is only one reception node of the BS 100 and signals are transmitted over respectively different subchannels, no signal interference problem may occur.

At the time where a time interval of the second phase expires, although the BS 100 has synchronized signals of the MS 1 151 and the MS2 152, the signals may be out of sync with the signals of the MS3 103 and the MS4 104. Thus, in the first phase, the BS 100 can receive signals of the MS3 103 and the MS4 104 without any interference, and correctly decode the received signals. This is because the signals of the MS1 151 and the MS2 152 do not arrive at the BS 100. Thereafter, the BS 100 may acquire information on the interference component the RS 150 receives in the first phase. As a result, the BS 100 decodes the signals relayed by the RS 150 using an interference cancellation technique.

Presume, for example, that a subcarrier allocated to the MS1 151 in the first phase is k. Then, the signal the RS 150 receives can be expressed as Equation (1).

$$Y_{RS}^{(Ph1)}(k) = H_{MS1-RS}(k)X_1(k) + N_{RS}(k) + \quad (1)$$
$$ICI_f(\overline{H}_{MS3-RS}(k), \overline{X}_3(k), \delta f_3) + ICI_f(\overline{H}_{MS4-RS}(k), \overline{X}_4(k), \delta f_4)$$

$H_{MS1-RS}(k)$, $H_{MS3-RS}(k)$ and $H_{MS4-RS}(k)$ denote channel responses of an MS1 (151)-RS (150) link, an MS3 (103)-RS (150) link, and an MS4 (104)-RS (150) link, respectively; $X_1(k)$, $X_3(k)$ and $X_4(k)$ denote symbols transmitted by the MS1 151, the MS3 103 and the MS4 104, respectively; $\delta t$ and $\delta f$ denote a timing offset and a frequency offset, respectively; $\overline{H}(k)$ and $\overline{X}(k)$ denote a set of channel factors and symbols for all subcarriers, respectively; and $N_{RS}(k)$ denotes an additive noise having an average of 0 and a variance of $\sigma_{RS}^2$. Transmission power is assumed to be normalized to 1 in all transmission nodes.

An amplification factor $\beta$ is determined as averaged transmission signal energy, and can be expressed as $$\beta = \sqrt{\frac{1}{\sum_k P(k)}},$$

where P(k) can be expressed as Equation (2).

$$P(k) = |H_{MS1-RS}(k)|^2 + |H_{MS2-RS}(k)|^2 + \quad (2)$$
$$\sigma_{RS}^2 + \text{var}[ICI_f(\overline{H}_{MS3-RS}(k), \overline{X}_3(k), \delta f_3)] +$$
$$\text{var}[ICI_f(\overline{H}_{MS4-RS}(k), \overline{X}_4(k), \delta f_4)]$$

The amplified signal received at the BS 100 can be expressed as Equation (3).

$$Y_{RS-BS}^{(Ph2)}(k) = \beta H_{RS-BS}(k)Y_{RS}^{(Ph1)}(k) + N_{BS}(k) \quad (3)$$

The BS 100 is assumed to correctly decode $X_3(k)$ and $X_4(k)$ in the first phase. The BS 100 can express $$Y_{RS-BS}^{(Ph2)}(k)$$

as an interference-free component of Equation (4) taking into account the variance $\sigma_{RS}^2$ and all the relevant parameters, i.e., $\beta$ and the ICI terms caused by the MS3 103 and the MS4 104.

$$Y_{RS-BS}^{(Ph2)}(k) = \beta H_{RS-BS}(k)H_{MS1-RS}(k)X_1(k) + \beta H_{RS-BS}(k)N_{BS}(k) \quad (4)$$

$$Y_{RS-BS}^{(Ph2)}(k)$$

is similar to $X_1(k)$ received at the RS, and $X_1(k)$ has no interference component. That is, the present invention can solve the synchronization problem through multiplexing of the signals transmitted from the MSs to the BS and the signals transmitted from the MSs to the RS in the same time interval, which can result in higher efficiency in terms of the wireless resource management.

Figure 2:
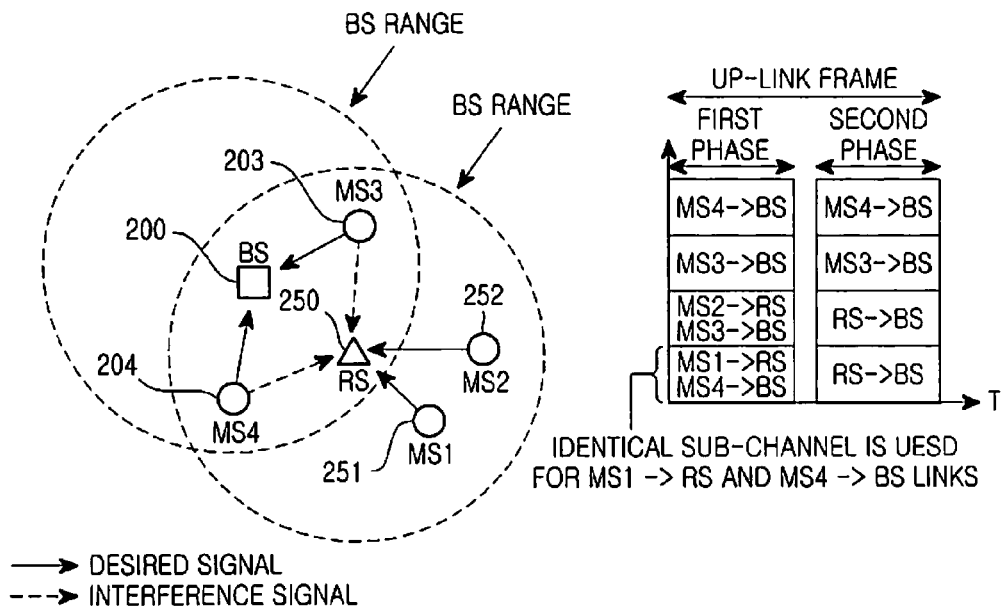
FIG. 2 is a diagram illustrating a cell structure and a frame structure for signal transmission/reception according to a second embodiment of the present invention.

A second embodiment described below with reference to FIG. 2 provides a scheme for allocating the same wireless resources to some MSs, thereby improving frequency efficiency and facilitating efficient signal transmission/reception.

FIG. 2 shows a cell structure and a frame structure for signal transmission/reception according to the second embodiment of the present invention.

In FIG. 2, an MS3 203 and an MS4 204 are located both in a region of a BS 200 and a region of an RS 250. An MS1 251 and an MS2 252 are located only in the region of the RS 250.

The second embodiment of the present invention, like the first embodiment, can distinguish the signals transmitted in two phase intervals (or time intervals), and the resources allocated to the MS1 251 and the MS4 204 are assumed to be equal, and the resources allocated to the MS2 252 and the MS3 203 are assumed to be equal.

The signals the RS receives in the first phase can be expressed as Equation (5).

$$Y_{RS}^{(Ph1)}(k) = H_{MS1-RS}(k)X_1(k) + \alpha_f(\delta f)H_{MS4-RS}(k)X_4(k) + ICI_f(\overline{H}_{MS4-RS}(k), \overline{X}_4(k), \delta f_4) + N_{RS}(k) \quad (5)$$

Equation (5) represents a form of the signals the RS 250 has received in the time domain. In the second embodiment of the present invention, the ICI caused by the use of neighboring subcarriers is assumed to be cancelled in the manner applied in the first embodiment of the present invention.

The RS 250 amplifies $Y_{RS}^{(Ph1)}(k)$ using an amplification factor $\beta$ and forwards the result to the BS 200.

As done in the first embodiment, the BS 200 decodes the signal $X_4(k)$ in the first phase, and then cancels the interference component therefrom. The interference component-cancelled signal transmitted from the RS 250 to the BS 200 can be expressed as Equation (6).

$$Y_{RS-BS}^{(Ph2)}(k) = \beta H_{RS-BS}(k)H_{MS1-RS}(k)X_1(k) + \beta H_{RS-BS}(k)N_{BS}(k) \quad (6)$$

The BS 200 can decode $X_1(k)$ obtained by cancelling the interference component from the signals that the MS1 251 and the MS4 204 have transmitted using the same wireless resources in the first phase.

Due to the use of the interference cancellation scheme described above, there is no need to allocate different wireless resources to the MSs located in the common region of the BS 200 and the RS 250, and the MSs located outside the region of the BS 200. That is, the wireless resources allocated to the MSs located outside the region of the BS 200, like the MS1 251 and the MS2 252, can be reused for the MS3 203 and the MS4 204 located in the region of the BS 200.

In uplink signal transmission, the signal transmitted by an MS located in a region of a particular RS can be received even at another RS according to a third embodiment of the present invention, described below with reference to FIG. 3.

Figure 3:
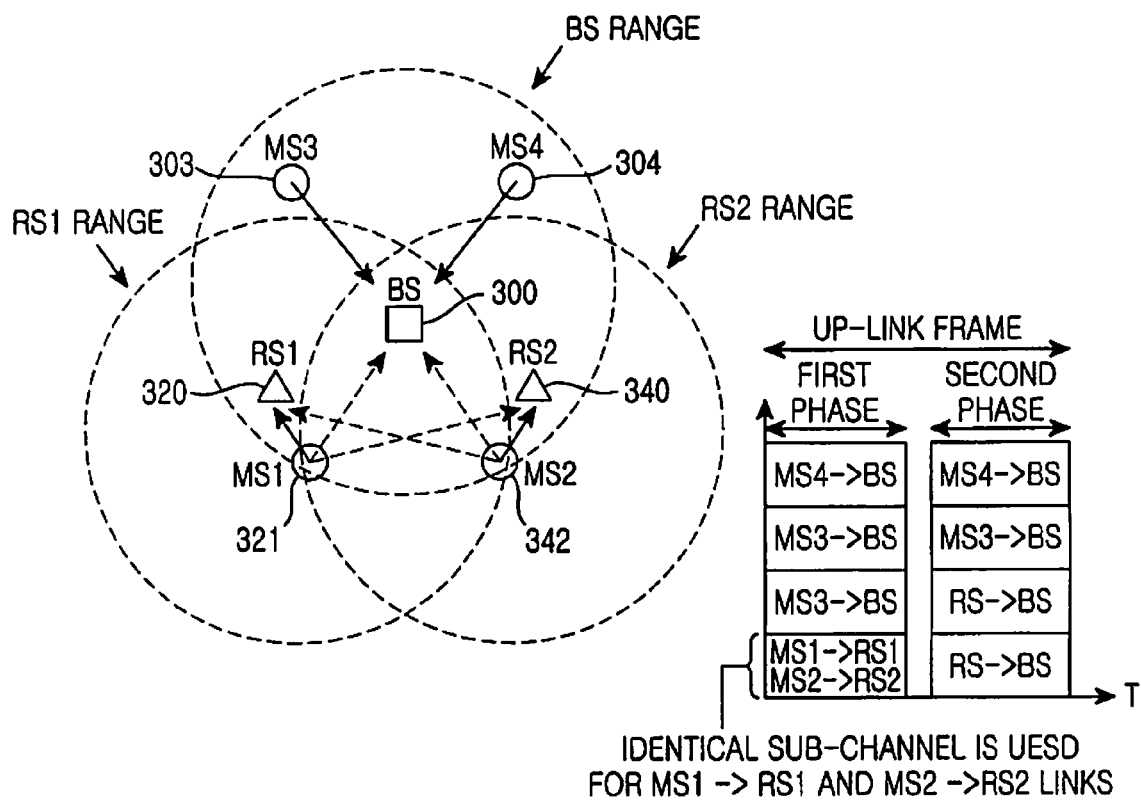
FIG. 3 is a diagram illustrating a cell structure and a frame structure for signal transmission/reception according to a third embodiment of the present invention.

FIG. 3 shows a cell structure and a frame structure for signal transmission/reception according to the third embodiment of the present invention.

Referring to FIG. 3, it can be seen that two MSs (i.e., MS3 303 and MS4 304) and two RSs (i.e., RS1 320 and RS2 340) are located in one cell. In addition, an MS1 321 and an MS2 342 are assumed to be located in a common region of the RS1

320 and the RS2 340, the MS1 321 is serviced by the RS1 320, and the MS2 342 is serviced by the RS2 340. Therefore, the signal transmitted by the MS1 321 can serve as an interference signal to the RS2 340, and the signal transmitted by the MS2 342 can serve as an interference signal to the RS1 320. As a basic scheme for solving such interference problems, there is a scheme in which the RS1 320 and the RS2 340 are allocated orthogonal wireless resources. However, the allocation of orthogonal wireless resources requires a large amount of wireless resources.

The third embodiment of the present invention described below provides a scheme capable of reducing the amount of wireless resources required in the relay communication system having multiple RSs, and a scheme capable of reducing the interference signals.

As described above, the MS1 321 and the MS2 342 are serviced by different RSs. In addition, the MS1 321 and the MS2 342 transmit signals using the same wireless resources in the same time interval (same phase). In this case, the signals received at each of the RS1 320 and the RS2 340 can be expressed as Equation (7).

$$Y_{RS1}^{(Ph1)}(k) = H_{MS1-RS1}(k)X_1(k) + \alpha_f(\delta f_2)H_{MS2-RS1}(k)X_2(k) + \quad (7)$$
$$ICI_f(\overline{H}_{MS2-RS1}(k), \overline{X}_2(k), \delta f_2) + N_{RS1}(k)$$
$$Y_{RS2}^{(Ph1)}(k) = H_{MS2-RS2}(k)X_1(k) + \alpha_f(\delta f_1)H_{MS1-RS2}(k)X_2(k) +$$
$$ICI_f(\overline{H}_{MS1-RS2}(k), \overline{X}_1(k), \delta f_1) + N_{RS2}(k)\dots$$

It can be appreciated from Equation (7) that the signal $$Y_{RS1}^{(Ph1)}(k)$$

received at the RS1 320 and the signal $$Y_{RS2}^{(Ph1)}(k)$$

received at the RS2 340 each have interference components. The RSs 320 and 340 amplify and transmit the signals to a BS 300 without decoding the signals.

If the subcarriers used by the RS1 320 and the RS2 340 are defined as $k_1$ and $k_2$, respectively, the signals $$Y_{RS1-BS}^{(Ph2)}(k_1)$$

and $$Y_{RS2-BS}^{(Ph2)}(k_2)$$

BS 300 receives from the RS1 320 and the RS2 340 can be expressed as Equation (8) and Equation (9), respectively.

$$Y_{RS1-BS}^{(Ph2)}(k_1) = \beta_{RS1}H_{RS1-BS}(k_1)Y_{RS1}^{(Ph1)}(k) + N_{BS1}(k) = \quad (8)$$
$$\beta_{RS1}H_{RS1-BS}(k_1)H_{MS1-RS1}(k)X_1(k) +$$
$$\beta_{RS1}\alpha_f(\delta f_2)H_{RS1-BS}(k_1)H_{MS2-RS1}(k)X_2(k) +$$
$$\beta_{RS1}H_{RS1-BS}(k_1)ICI_f(\overline{H}_{MS2-RS1}(k), \overline{X}_2(k), \delta f_2) +$$
$$\beta_{RS1}H_{RS1-BS}(k_1)N_{RS1}(k) + N_{BS1}(k_1)\dots$$

$$Y_{RS2-BS}^{(Ph2)}(k_2) = \beta_{RS2}H_{RS2-BS}(k_2)Y_{RS2}^{(Ph1)} + N_{BS2}(k) = \quad (9)$$
$$\beta_{RS2}H_{RS2-BS}(k_2)H_{MS2-RS2}(k)X_2(k) +$$
$$\beta_{RS2}\alpha_f(\delta f_1)H_{RS2-BS}(k_2)H_{MS1-RS2}(k)X_1(k) +$$
$$\beta_{RS2}H_{RS2-BS}(k_2)ICI_f(\overline{H}_{MS1-RS2}(k), \overline{X}_1(k), \delta f_1) +$$
$$\beta_{RS2}H_{RS2-BS}(k_2)N_{RS2}(k) + N_{BS2}(k_2).$$

The signal energy transmitted by the RSs is normalized to 1, and $\beta_{RS1}$ and $\beta_{RS2}$ can be determined as described in the first embodiment.

The communication system having the cell structure and frame structure shown in FIG. 3 is equivalent to a 2×2 Multiple Input Multiple Output (MIMO) system that can be expressed as Equation (10).

$$\begin{bmatrix} Y_{RS1-BS}^{(Ph2)}(k_1) \\ Y_{RS2-BS}^{(Ph2)}(k_2) \end{bmatrix} = H_{2\times 2} \begin{bmatrix} X_1(k) \\ X_2(k) \end{bmatrix} + \begin{bmatrix} N(k_1) \\ N(k_2) \end{bmatrix} \quad (10)$$

with $$H_{2\times 2} = \begin{bmatrix} \beta_{RS1}H_{RS1-BS}(k_1)H_{MS1-RS1}(k) & \beta_{RS1}\alpha_f(\delta f_2)H_{RS1-BS}(k_1)H_{MS2-RS1}(k) \\ \beta_{RS2}\alpha_f(\delta f_1)H_{RS2-BS}(k_1)H_{MS1-RS2}(k) & \beta_{RS2}H_{RS2-BS}(k_1)H_{MS2-RS2}(k) \end{bmatrix}$$

$$\begin{bmatrix} N(k_1) \\ N(k_2) \end{bmatrix} = \begin{bmatrix} \beta_{RS1}H_{RS1-BS}(k_1)ICI_f(\overline{H}_{MS2-RS1}(k), \overline{X}_2(k), \delta f_2) + \beta_{RS1}H_{RS1-BS}(k_1)N_{RS1}(k) + N_{BS}(k_1) \\ \beta_{RS2}H_{RS1-BS}(k_1)ICI_f(\overline{H}_{MS1-RS2}(k), \overline{X}_1(k), \delta f_1) + \beta_{RS2}H_{RS1-BS}(k_1)N_{RS2}(k) + N_{BS}(k_2) \end{bmatrix}\dots$$

It can be appreciated that Equation (10) includes ICI components. However, the decoding performance of the system is superior, as there is no multi-stream interference inherent to the MIMO system.

As is apparent from the foregoing description, the present invention can increase the wireless resource utilization and minimize the effect of signal interference in the relay communication system, thereby facilitating the efficient signal transmission/reception.

While the invention has been shown and described with reference to a certain preferred embodiments thereof, it will be understood by those skilled in the art that various changes in form and details may be made therein without departing from the spirit and scope of the invention as defined by the appended claims.

What is claimed is:

1. A method for receiving signals by a base station in a communication system, the method comprising:
   allocating a first wireless resource to a first mobile station;
   allocating a second wireless resource to a second mobile station;
   receiving a first signal from the first mobile station in a first time interval;
   receiving a second signal from a relay station in a second time interval; and
   detecting a third signal transmitted by the second mobile station, from the second signal taking into account interference caused by the first signal,
   wherein the first mobile station is a mobile station located in a third region, where a first region, which is a region of the base station, overlaps with a second region, which is a region of the relay station,
   wherein the second mobile station is a mobile station located in a fourth region not overlapping with the first region in the second region,
   wherein the first wireless resource is used for transmitting the first signal to the base station by the first mobile station in the first time interval, the second wireless resource is used for transmitting the second signal to the relay station by the second mobile station in the first time interval, and
   wherein the first wireless resource is different from the second wireless resource.

2. The method of claim 1, wherein the first wireless resource is different from a third wireless resource allocated to a third mobile station different from the first mobile station, located in the third region, and the second wireless resource is different from a fourth wireless resource allocated to a fourth mobile station different from the second mobile station, located in the fourth region, and
   wherein the third wireless resource and the fourth wireless resource are used in the first time interval.

3. A method for receiving signals by a base station in a communication system, the method comprising:
   allocating a first wireless resource to a first mobile station;
   allocating a second wireless resource to a second mobile station;
   receiving a first signal from the first mobile station in a first time interval; and
   receiving a second signal from a relay station in a second time interval; and
   detecting a third signal transmitted by the second mobile station, from the second signal taking into account interference caused by the first signal,
   wherein the first mobile station is a mobile station located in a third region, where a first region, which is a region of the base station, overlaps with a second region, which is a region of the relay station,
   wherein the second mobile station is a mobile station located in a fourth region not overlapping with the first region in the second region,
   wherein the first wireless resource is used for transmitting the first signal to the base station by the first mobile station in the first time interval, the second wireless resource is used for transmitting the second signal to the relay station by the second mobile station in the first time interval, and
   wherein the first wireless resource is identical to the second wireless resource.

4. The method of claim 3, wherein the first wireless resource is different from a third wireless resource allocated to a third mobile station different from the first mobile station, located in the third region, and the second wireless resource is different from a fourth wireless resource allocated to a fourth mobile station different from the second mobile station, located in the fourth region, and
   wherein the third wireless resource and the fourth wireless resource are used in the first time interval.

5. A method for receiving signals by a base station in a communication system, the method comprising:
   allocating a first wireless resource to a first mobile station;
   allocating second wireless resources to second mobile stations;
   receiving a first signal from the first mobile station in a first time interval; and
   receiving second signals transmitted by the second mobile stations from a plurality of relay stations using different wireless resources in a second time interval,
   wherein the first mobile station is a mobile station located in a first region not overlapping with a region of the plurality of relay stations in a region of the base station, in which the plurality of relay stations and a plurality of mobile stations are located,
   wherein the second mobile stations are mobile stations located in a second region not overlapping with the first region in the region of the plurality of relay stations,
   wherein the first wireless resource is used for transmitting the first signal to the base station by the first mobile station in the first time interval, and the first wireless resource is different from the second wireless resources, and
   wherein the second wireless resources are used for transmitting the second signals to the plurality of relay stations by the second mobile stations in the first time interval, and the second wireless resources are identical.

6. The method of claim 5, wherein the first wireless resource is different from a third wireless resource allocated to a third mobile station different from the first mobile station, located in the first region. and the third wireless resource is used in the first time interval.

7. A method for transmitting signals by a mobile station in a communication system, the method comprising:
   if the mobile station is a first mobile station, transmitting a first signal to a base station using a first wireless resource in a first time interval; and
   if the mobile station is a second mobile station, transmitting a second signal to a relay station using a second wireless resource in the first time interval,
   wherein the first mobile station is a mobile station located in a third region, where a first region, which is a region of the base station, overlaps with a second region, which is a region of the relay station,
   wherein the second mobile station is a mobile station located in a fourth region not overlapping with the first region in the second region, and
   wherein the first wireless resource is different from the second wireless resource.

8. The method of claim 7, wherein the first wireless resource is different from a third wireless resource allocated to a third mobile station different from the first mobile station, located in the third region, and the second wireless resource is different from a fourth wireless resource allocated to a fourth mobile station different from the second mobile station, located in the fourth region, and
   wherein the third wireless resource and the fourth wireless resource are used in the first time interval.

9. A method for transmitting signals by a mobile station in a communication system, the method comprising:

if the mobile station is a first mobile station, transmitting a first signal to a base station using first wireless resource in a first time interval; and if the mobile station is a second mobile station, transmitting a second signal to a relay station using second wireless resource in the first time interval, wherein the first mobile station is a mobile station located in a third region, where a first region, which is a region of the base station, overlaps with a second region, which is a region of the relay station, wherein the second mobile station is a mobile station located in a fourth region not overlapping with the first region in the second region, and wherein the first wireless resource is identical to the second wireless resource.

10. The method of claim 9, wherein the first wireless resource is different from a third wireless resource allocated to a third mobile station different from the first mobile station, located in the third region, and the second wireless resource is different from a fourth wireless resource allocated to a fourth mobile station different from the second mobile station, located in the fourth region, and wherein the third wireless resource and the fourth wireless resource are used in the first time interval.

11. A method for transmitting signals by a mobile station in a communication system using a relay scheme, the method comprising:

if the mobile station is a first mobile station, transmitting a first signal to a base station using a first wireless resource in a first time interval; and if the mobile station is a second mobile station, transmitting a second signal to a first relay station using a second wireless resource in the first time interval, wherein the first mobile station is a mobile station located in a first region not overlapping with a region of a plurality of relay stations using different wireless resources in a region of the base station, in which the plurality of relay stations and a plurality of mobile stations are located, wherein the second mobile station is a mobile station located in a second region not overlapping with the first region in the region of the plurality of relay stations, and wherein the first wireless resource is different from the second wireless resource, and the second wireless resource is identical to a third wireless resource used for transmitting a signal to a second relay station different from the first relay station among the plurality of relay stations.

12. The method of claim 11, wherein the first wireless resource is different from a fourth wireless resource allocated to a third mobile station different from the first mobile station, located in the first region, and the third wireless resource is used in the first time interval.

13. An apparatus for receiving signals in a communication system, the apparatus comprising:

an allocator for allocating a first wireless resource to a first mobile station, and allocating a second wireless resource to a second mobile station; and a receiver for receiving a first signal from the first mobile station in a first time interval, and receiving a second signal from a relay station in a second time interval, and detecting a third signal transmitted by the second mobile station, from the second signal taking into account interference caused by the first signal, wherein the first mobile station is a mobile station located in a third region, where a first region, which is a region of the base station, overlaps with a second region, which is a region of the relay station, wherein the second mobile station is a mobile station located in a fourth region not overlapping with the first region or the second region, and wherein the first wireless resource is used for transmitting the first signal to the base station by the first mobile station in the first time interval, the second wireless resource is used for transmitting the second signal to the relay station by the second mobile station in the first time interval, and wherein the first wireless resource is different from the second wireless resource.

14. The apparatus of claim 13, wherein the first wireless resource is different from a third wireless resource allocated to a third mobile station different from the first mobile station, located in the third region, and the second wireless resource is different from a fourth wireless resource allocated to a fourth mobile station different from the second mobile station, located in the fourth region, and wherein the third wireless resource and the fourth wireless resource are used in the first time interval.

15. An apparatus for receiving signals in a communication system, the apparatus comprising:

an allocator for allocating a first wireless resource to a first mobile station, and allocating a second wireless resource to a second mobile station; and a receiver for receiving a first signal from the first mobile station in a first time interval, and receiving a second signal from a relay station in a second time interval, and detecting a third signal transmitted by the second mobile station, from the second signal taking into account interference caused by the first signal, wherein the first mobile station is a mobile station located in a third region, where a first region, which is a region of the base station, overlaps with a second region, which is a region of the relay station, wherein the second mobile station is a mobile station located in a fourth region not overlapping with the first region in the second region, and wherein the first wireless resource is used for transmitting the first signal to the base station by the first mobile station in the first time interval, the second wireless resource is used for transmitting the second signal to the relay station by the second mobile station in the first time interval, and wherein the first wireless resource is identical to the second wireless resource.

16. The apparatus of claim 15, wherein the first wireless resource is different from a third wireless resource allocated to a third mobile station different from the first mobile station, located in the third region, and the second wireless resource is different from a fourth wireless resource allocated to a fourth mobile station different from the second mobile station, located in the fourth region, and wherein the third wireless resource and the fourth wireless resource are used in the first time interval.

17. An apparatus for receiving signals in a communication system, the apparatus comprising:

an allocator for allocating a first wireless resource to a first mobile station, and allocating second wireless resources to second mobile stations; and a receiver for receiving a first signal from the first mobile station in a first time interval, and receiving second signals transmitted by the second mobile stations from a plurality of relay stations using different wireless resources in a second time interval, wherein the first mobile station is a mobile station located in a first region not overlapping with a region of the plurality of relay stations using different wireless resources in a region of the base station, in which the plurality of relay stations and a plurality of mobile stations are located, wherein the second mobile stations are mobile stations located in a second region not overlapping with the first region in the region of the plurality of relay stations, wherein the first wireless resource is used for transmitting the first signal to the base station by the first mobile station in the first time interval, and the first wireless resource is different from the second wireless resources, and wherein the second wireless resources are used for transmitting the second signals to the plurality of relay stations by the second mobile stations in the first time interval, and the second wireless resources are identical.

18. The apparatus of claim 17, wherein the first wireless resource is different from a third wireless resource allocated to a third mobile station different from the first mobile station, located in the first region, and the third wireless resource is used in the first time interval.

19. An apparatus for transmitting signals in a communication system, the apparatus comprising:

a transmitter for transmitting a first signal to a base station using a first wireless resource in a first time interval, if the mobile station is a first mobile station, and transmitting a second signal to a relay station using a second wireless resource in the first time interval, if the mobile station is a second mobile station, wherein the first mobile station is a mobile station located in a third region, where a first region, which is a region of the base station, overlaps with a second region, which is a region of the relay station, wherein the second mobile station is a mobile station located in a fourth region not overlapping with the first region in the second region, and wherein the first wireless resource is different from the second wireless resource.

20. The apparatus of claim 19, wherein the first wireless resource is different from a third wireless resource allocated to a third mobile station different from the first mobile station, located in the third region, and the second wireless resource is different from a fourth wireless resource allocated to a fourth mobile station different from the second mobile station, located in the fourth region, and wherein the third wireless resource and the fourth wireless resource are used in the first time interval.

21. An apparatus for transmitting signals in a communication system, the apparatus comprising:

a transmitter for transmitting a first signal to a base station using a first wireless resource in a first time interval, if the mobile station is a first mobile station, and transmitting a second signal to a relay station using a second wireless resource in the first time interval, if the mobile station is a second mobile station, wherein the first mobile station is a mobile station located in a third region; which is a region where a first region, which is a region of the base station, overlaps with a second region, which is a region of the relay station, wherein the second mobile station is a mobile station located in a fourth region which is a region not overlapping with the first region in the second region, and wherein the first wireless resource is identical to the second wireless resource.

22. The apparatus of claim 21, wherein the first wireless resource is different from a third wireless resource allocated to a third mobile station different from the first mobile station, located in the third region, and the second wireless resource is different from a fourth wireless resource allocated to a fourth mobile station different from the second mobile station, located in the fourth region, and wherein the third wireless resource and the fourth wireless resource are used in the first time interval.

23. An apparatus for transmitting signals in a communication system, the apparatus comprising:

a transmitter for transmitting a first signal to a base station using first wireless resource in a first time interval, if the mobile station is a first mobile station, and transmitting a second signal to a first relay station using second wireless resource in the first time interval, if the mobile station is a second mobile station, wherein the first mobile station is a mobile station located in a first region not overlapping with a region of a plurality of relay stations using different wireless resources in a region of the base station, in which the plurality of relay stations and a plurality of mobile stations are located, wherein the second mobile station is a mobile station located in a second region not overlapping with the first region in region of the plurality of relay stations, and wherein the first wireless resource is different from and the second wireless resource, and the second wireless resource is identical to a third wireless resource used for transmitting a signal to a second relay station different from the first relay station among the plurality of relay stations.

24. The apparatus of claim 23, wherein the first wireless resource is different from a fourth wireless resource allocated to a third mobile station different from the first mobile station, located in the first region, and the third wireless resource is used in the first time interval.

* * * * *